US009938854B2

(12) United States Patent
Simpson et al.

(10) Patent No.: US 9,938,854 B2
(45) Date of Patent: Apr. 10, 2018

(54) GAS TURBINE ENGINE AIRFOIL CURVATURE

(71) Applicant: United Technologies Corporation, Hartford, CT (US)

(72) Inventors: Alex J. Simpson, Tolland, CT (US); Timothy Charles Nash, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 335 days.

(21) Appl. No.: 14/712,067

(22) Filed: May 14, 2015

(65) Prior Publication Data

US 2015/0361826 A1     Dec. 17, 2015

Related U.S. Application Data

(60) Provisional application No. 62/001,915, filed on May 22, 2014.

(51) Int. Cl.
*F01D 25/06* (2006.01)
*F01D 9/04* (2006.01)
(Continued)

(52) U.S. Cl.
CPC ............ *F01D 25/06* (2013.01); *F01D 5/141* (2013.01); *F01D 5/145* (2013.01); *F01D 5/16* (2013.01); *F01D 5/22* (2013.01); *F01D 5/26* (2013.01); *F01D 9/04* (2013.01); *F01D 9/041* (2013.01); *F01D 9/047* (2013.01); *F01D 1/02* (2013.01); *F01D 5/02* (2013.01); *F01D 5/10* (2013.01); *F01D 5/143* (2013.01);
(Continued)

(58) Field of Classification Search
CPC . F01D 25/04; F01D 25/06; F01D 5/10; F01D 5/16; F01D 5/22; F01D 5/26; F01D 5/141; F01D 5/143; F01D 5/145; F01D 9/04; F01D 9/041; F01D 9/047; F05D 2260/96; F05D 2260/961; F05D 2260/962
See application file for complete search history.

(56) References Cited

U.S. PATENT DOCUMENTS 2,795,373 A * 6/1957 Hewson .................. F01D 5/141
138/148
4,012,165 A   3/1977 Kraig
(Continued)

FOREIGN PATENT DOCUMENTS

JP          s59150903        8/1984

OTHER PUBLICATIONS

Extended European Search Report for European Application No. 15168146.7, dated Oct. 14, 2015.

*Primary Examiner* — Igor Kershteyn
*Assistant Examiner* — Brian P Wolcott
(74) *Attorney, Agent, or Firm* — Carlson, Gaskey & Olds, P.C.

(57) ABSTRACT

A gas turbine engine includes an array of airfoils. Each airfoil includes a first circumferentially extreme position. The first circumferentially extreme positions of the airfoils are circumferentially spaced apart from one another a pitch. Each airfoil includes a second circumferentially extreme position circumferentially spaced from the first circumferentially extreme position in an angular spacing that is at least one half the pitch.

8 Claims, 3 Drawing Sheets

(51) Int. Cl.
  *F01D 5/14*   (2006.01)
  *F01D 5/16*   (2006.01)
  *F01D 5/22*   (2006.01)
  *F01D 5/26*   (2006.01)
  *F01D 5/10*   (2006.01)
  *F01D 1/02*   (2006.01)
  *F01D 5/02*   (2006.01)

(52) U.S. Cl.
  CPC ...... *F05D 2220/32* (2013.01); *F05D 2260/96* (2013.01); *Y02T 50/673* (2013.01)

(56) References Cited

U.S. PATENT DOCUMENTS

| | | | |
|---|---|---|---|
| 4,826,400 A * | 5/1989 | Gregory | ............... F01D 5/141 415/181 |
| 5,088,892 A | 2/1992 | Weingold et al. | |
| 5,667,361 A | 9/1997 | Yeager et al. | |
| 6,299,412 B1 | 10/2001 | Wood et al. | |
| 6,328,533 B1 | 12/2001 | Decker et al. | |
| 6,508,630 B2 | 1/2003 | Liu et al. | |
| 6,726,445 B2 | 5/2004 | Tsuchiya et al. | |
| 7,118,330 B2 | 10/2006 | Tsuru et al. | |
| 7,399,158 B2 | 7/2008 | Care et al. | |
| 7,645,119 B2 | 1/2010 | Nomura et al. | |
| 7,726,937 B2 | 6/2010 | Baumann et al. | |
| 2014/0248144 A1 | 9/2014 | Cellier et al. | |
| 2015/0078908 A1 | 3/2015 | Calza | |

* cited by examiner

US 9,938,854 B2

GAS TURBINE ENGINE AIRFOIL CURVATURE

CROSS-REFERENCE TO RELATED APPLICATIONS

This application claims priority to U.S. Provisional Application No. 62/001,915, which was filed on May 22, 2014 and is incorporated herein by reference.

STATEMENT REGARDING FEDERALLY SPONSORED RESEARCH OR DEVELOPMENT

This invention was made with government support under Contract No. FA8650-09-D-2923-0021, awarded by the Air Force. The Government has certain rights in this invention.

BACKGROUND

This disclosure relates to an array of airfoils within a stage of a gas turbine engine, for example, a turbine stator vane array.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The compressor and turbine section includes circumferential arrangements of fixed and rotating stages. Structural vibratory coupling between adjacent airfoils can occur during engine operation. For rotating stages of the engine, blade mistuning has been used in which there are two sets of blades are arranged in circumferentially alternating relationship to provide an even numbered blade array. One set of blades has a different characteristic than the other set of blades to provide two different resonant frequencies. For fixed stages, vanes have been mistuned by providing different sets of vanes in adjacent quadrants of the array.

A significant driver for turbine blade vibration is the pressure distortion produced by the interaction of the array of blades and the axially adjacent array of turbine vanes. As the blades pass the vanes, a pressure fluctuation occurs at the frequency at which the blades pass the vanes. Depending upon the distribution of pressure on the blades, certain blade vibratory modes may be excited if the blade/vane passing frequency matches the normal mode of the blade.

SUMMARY

In one exemplary embodiment, a gas turbine engine includes an array of airfoils. Each airfoil includes a first circumferentially extreme position. The first circumferentially extreme positions of the airfoils are circumferentially spaced apart from one another a pitch. Each airfoil includes a second circumferentially extreme position circumferentially spaced from the first circumferentially extreme position in an angular spacing that is at least one half the pitch.

In a further embodiment of the above, the first circumferentially extreme position is one radial end of the airfoil.

In a further embodiment of any of the above, the second circumferentially extreme position is another radial end of the airfoil opposite the one radial end.

In a further embodiment of any of the above, the airfoil includes another radial end of the airfoil opposite the one radial end. The second circumferentially extreme position is located radially between the one radial end and the other radial end.

In a further embodiment of any of the above, the angular spacing is approximately the pitch.

In a further embodiment of any of the above, the angular spacing is greater than the pitch.

In a further embodiment of any of the above, the gas turbine engine includes a rotating stage and a fixed stage of stator vanes. The array of airfoils provides the fixed stage of stator vanes.

In a further embodiment of any of the above, the stator vanes include inner and outer platforms. The airfoil extends radially between and joins the inner and outer platforms.

In a further embodiment of any of the above, the first and second circumferentially extreme positions are provided by the airfoil at the inner and outer platforms.

In a further embodiment of any of the above, there is a turbine section in which the array is arranged in the turbine section.

In a further embodiment of any of the above, the array of airfoils is configured to produce a radial alternating pressure amplitude and phase distribution on the blades in the rotating stage that reduces the response of potentially damaging vibratory modes for the blade.

In another exemplary embodiment, an array of airfoils includes airfoils. The first circumferentially extreme positions of the airfoils are circumferentially spaced apart from one another a pitch. Each airfoil includes a second circumferentially extreme position circumferentially spaced from the first circumferentially extreme position an angular spacing that is at least one half the pitch.

In a further embodiment of the above, the first circumferentially extreme position is one radial end of the airfoil.

In a further embodiment of any of the above, the second circumferentially extreme position is another radial end of the airfoil opposite the one radial end.

In a further embodiment of any of the above, the airfoil includes another radial end of the airfoil opposite the one radial end. The second circumferentially extreme position is located radially between the one radial end and the other radial end.

In a further embodiment of any of the above, the angular spacing is approximately the pitch.

In a further embodiment of any of the above, the angular spacing is greater than the pitch.

In a further embodiment of any of the above, the array is a fixed stage of stator vanes.

In a further embodiment of any of the above, the stator vanes include inner and outer platforms. The airfoil extends radially between and joining the inner and outer platforms.

In a further embodiment of any of the above, the first and second circumferentially extreme positions are provided by the airfoil at the inner and outer platforms.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
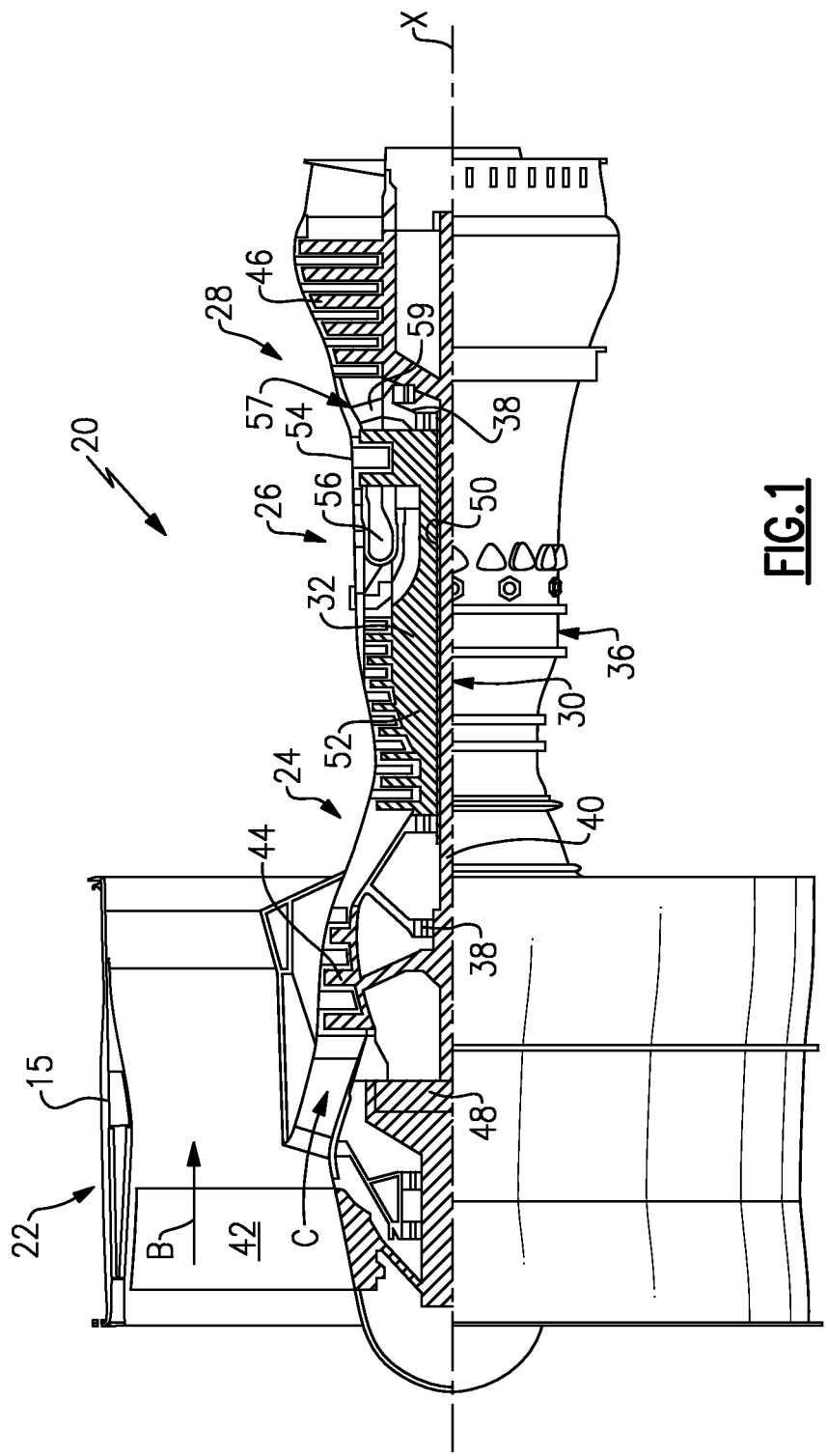
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture may be varied. For example, geared architecture 48 may be located aft of combustor section 26 or even aft of turbine section 28, and fan section 22 may be positioned forward or aft of the location of geared architecture.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
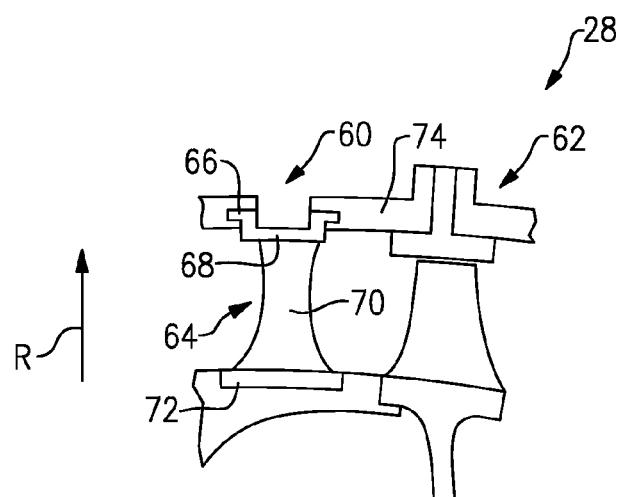
FIG. 2 is a schematic view through an engine section including a fixed stage and a rotating stage.

Referring to FIG. 2, a portion of an engine section is shown, for example, a turbine section. It should be understood, however, that disclosed section also may be provided in a compressor section or as a fan exit guide vane, for example.

The section includes a fixed stage 60 that provides a circumferential array 61 (FIG. 3A) of vanes 64 arranged axially adjacent to a rotating stage 62. In the example, the vanes 64 includes an outer diameter portion 68 having hooks 66 that support the array of vanes 64 with respect to a case structure 74. An airfoil 70 extends radially from a platform of the outer diameter portion 68 to an inner diameter portion or platform 72. It should be understood that the disclosed vane arrangement could be used for vane structures having a cantilevered inner diameter portion of the airfoil.

Figure 3A:
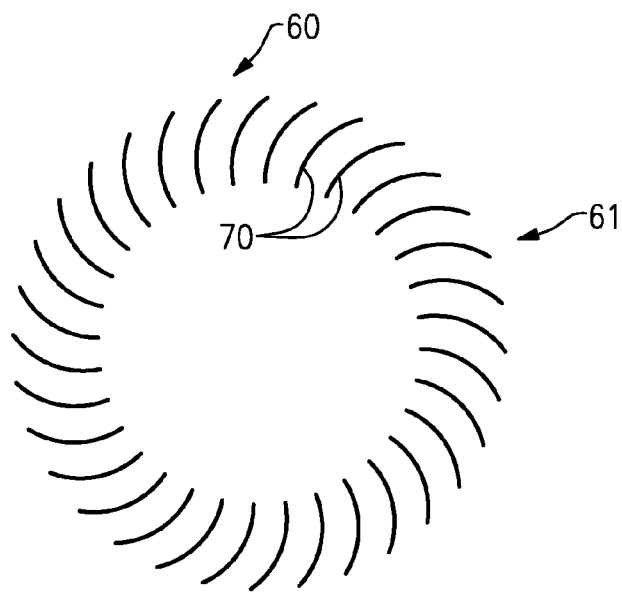
FIG. 3A is a schematic axial view depicting an array of airfoils.
Figure 3B:
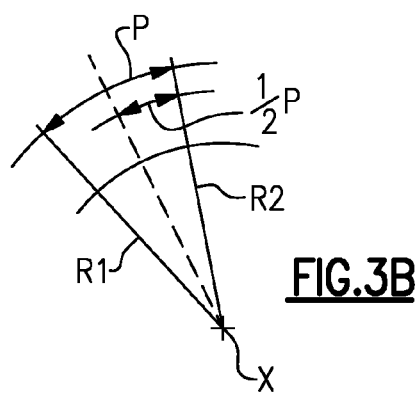
FIG. 3B schematically depicts the pitch and angular spacing between extreme circumferential positions of adjacent airfoils.

The array 61 of airfoils 70 in the fixed stage 60 is schematically shown in FIG. 3A. The airfoils 70 include first and second circumferentially extreme positions that are circumferentially spaced apart from one another a pitch P, as shown in FIG. 3B. The first circumferentially extreme position of one airfoil lies along a first radius R1. The first circumferentially extreme position on the adjacent airfoil lies along a second radial position R2, which defines a pitch P between adjacent airfoils.

The disclosed array of airfoil uses the geometry of the vanes to tailor the pressure distribution that the downstream array of blades will encounter. The radial distribution of the phase of maximum alternating pressure that the blade encounters each rotation is varied. The pressure-phase distribution is tailored to not excite a particular blade mode shape and make the "modal efficiency" of the excitation low. The result is that potentially damaging vibratory modes of the blade are not efficiently excited. This is achieved by curving the airfoil such that at least a portion of the airfoil in the circumferential direction has an amplitude or angular spacing greater than at least half of the pitch, and in another example, approximately the pitch. In another example, the angular spacing between the first and second circumferentially extreme positions is greater than one pitch.

Figure 4A:
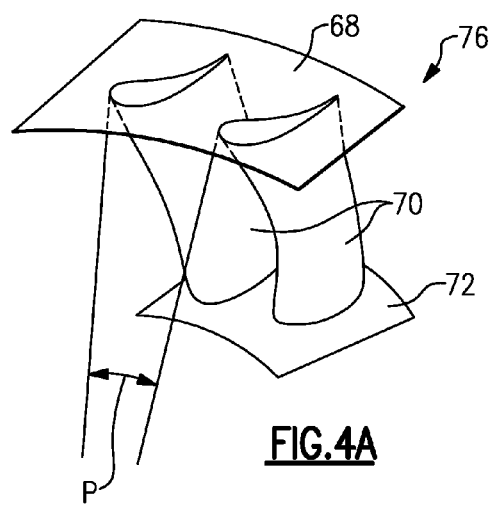
FIG. 4A is a schematic isometric view of one example vane cluster.
Figure 4B:
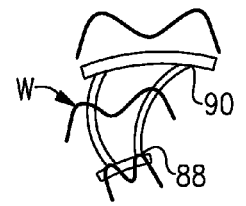
FIG. 4B is a schematic axial end view of the vane cluster shown in FIG. 4A.
Figure 4C:
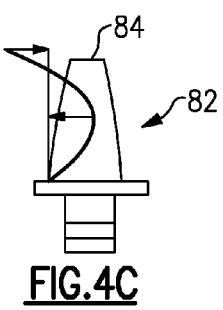
FIG. 4C schematically depicts the pressure distribution on an adjacent array of rotating blades.
Figure 5:
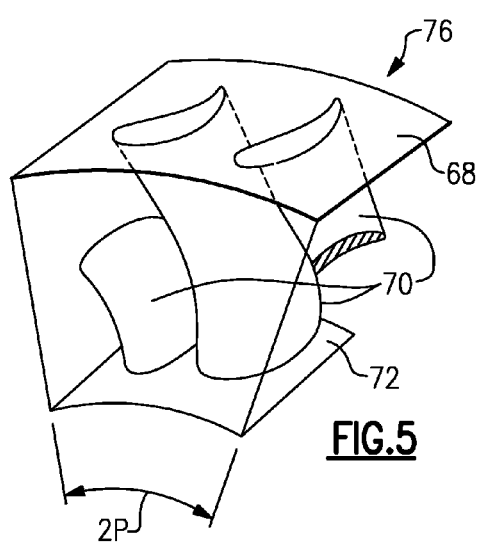
FIG. 5 is another schematic isometric view of cyclic sector of the vane array shown in FIG. 4A.

An example vane cluster 76 is shown in FIG. 4A. The airfoil 70 interconnects outer and inner platforms 68, 72. Referring to FIG. 5, another section of vane cluster 76 is shown. The airfoils 70 interconnect the outer and inner platforms 68, 72. The first circumferentially extreme position 88 is provided where the airfoil joins the inner platform, as best shown in FIG. 4B. The second circumferentially extreme position is provided where the airfoil joins the outer platform 90. Again, the pressure wave W is out of phase with the first circumferentially extreme position 88, which produces a maximum pressure on the blade 82 that is radially inboard from the tip 84, as best shown in FIG. 4C.

Figure 6A:
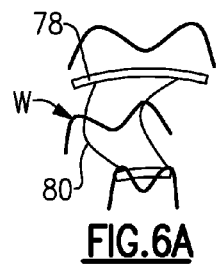
FIG. 6A is a schematic axial edge end view of another vane cluster.

The second circumferentially extreme position corresponds to a location radially between the location at which the airfoil connects to the inner and outer platform. In the example, the second circumferentially extreme position is at approximately an intermediate location 80 (FIG. 6A).

Figure 6B:
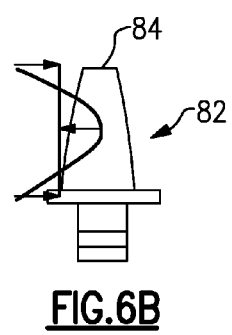
FIG. 6B schematically depicts the pressure distribution from the vane array in 6A on an adjacent array of rotating blades.

In this example, the first circumferentially extreme position corresponds to a location of the airfoil at the outer platform 78. As shown in FIG. 6A, a pressure wave W at the second circumferentially extreme positions is out of phase with the first circumferentially extreme position. As a result, a maximum pressure is provided at a radial location along the blade 82 that is offset from the tip 84, as best shown in FIG. 6B.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
    a rotating stage including an array of blades having a vibratory mode; and
    a fixed stage of stator vanes having an array of airfoils arranged immediately upstream from the array of blades, each airfoil including a first circumferentially extreme position at a first same span position, the first circumferentially extreme positions of each airfoil circumferentially spaced apart from one another a pitch, each airfoil including a second circumferentially extreme position at a second same span position that is different than the first same span location, the second circumferentially extreme position circumferentially spaced from the first circumferentially extreme position of a same airfoil in the array of airfoils by a pitch spacing that is in a range of 0.5-1.0 times the pitch, wherein the array of airfoils is configured to produce a radial alternating pressure amplitude and phase distribution on the array of blades that does not excite the vibratory mode thereby avoiding damage to the array of blades.

2. The gas turbine engine according to claim 1, wherein the first same span position is one radial end of each airfoil.

3. The gas turbine engine according to claim 2, wherein the second same span position is another radial end of each airfoil opposite the one radial end.

4. The gas turbine engine according to claim 2, wherein each airfoil includes another radial end opposite the one radial end, the second same span position located radially between the one radial end and the other radial end.

5. The gas turbine engine according to claim 1, wherein the pitch spacing is the pitch.

6. The gas turbine engine according to claim 1, wherein the stator vanes include inner and outer platforms, each airfoil extending radially between and joining the inner and outer platforms.

7. The gas turbine engine according to claim 6, wherein the first and second same span positions are provided by each airfoil at the inner and outer platforms.

8. The gas turbine engine according to claim 1, comprising a turbine section, wherein the array of airfoils is arranged in the turbine section.

* * * * *